UNITED STATES PATENT OFFICE.

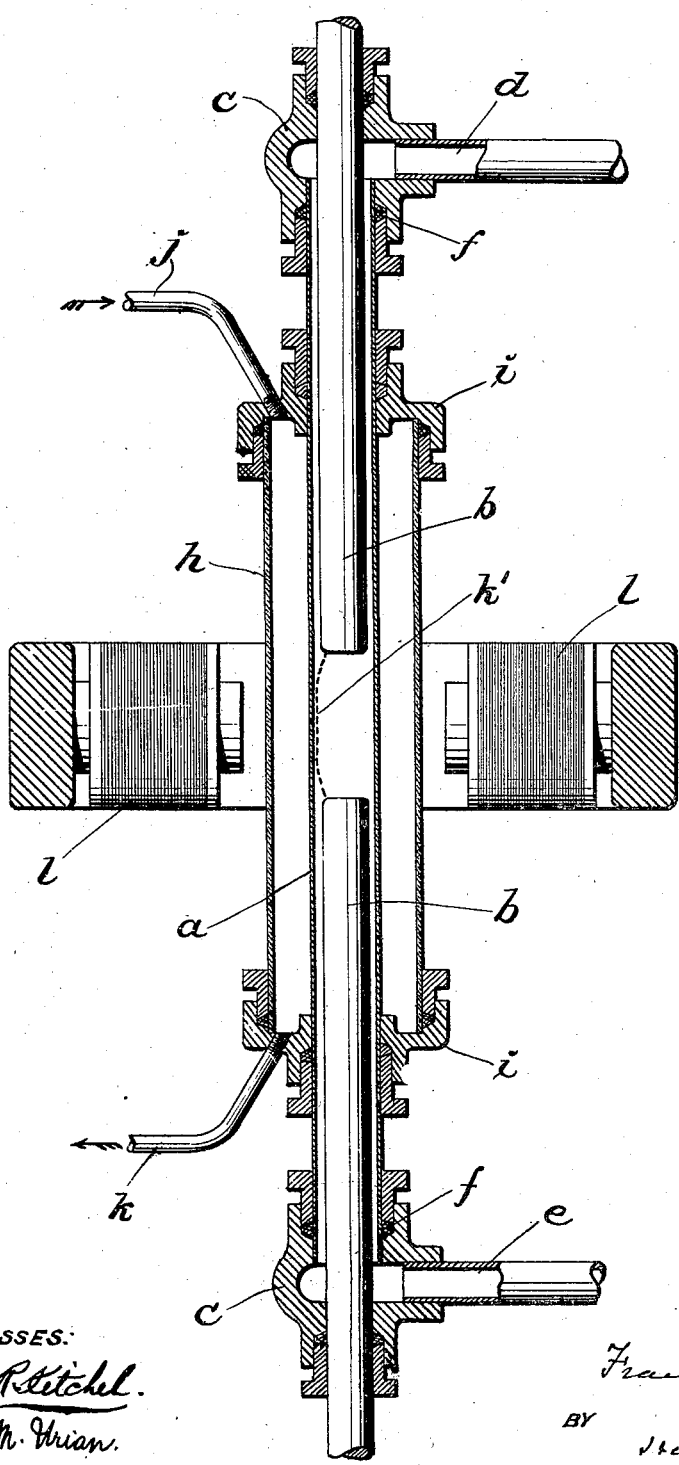

FRANCIS I. DU PONT, OF WILMINGTON, DELAWARE, ASSIGNOR TO THE E. I. DU PONT DE NEMOURS POWDER COMPANY, OF WILMINGTON, DELAWARE, A CORPORATION OF NEW JERSEY.

APPARATUS FOR PRODUCING OXIDS OF NITROGEN FROM THE AIR.

950,703.  Specification of Letters Patent.  Patented Mar. 1, 1910.

Application filed April 17, 1909. Serial No. 490,602.

*To all whom it may concern:*

Be it known that I, FRANCIS I. DU PONT, a citizen of the United States, residing at Wilmington, county of Newcastle and State of Delaware, have invented a new and useful Improvement in Apparatus for Producing Oxids of Nitrogen from the Air, of which the following is a full, clear, and exact description, reference being had to the accompanying drawings, which form a part of this specification.

Speaking generally, I subject the air contiguous to a cooling medium to the action of a moving arc whereby the high temperature of the air produced by the arc is immediately and rapidly reduced, thus producing the best possible conditions for the production of oxids of nitrogen from the air. In order to produce a continuous and not disconnected arc, the air container should be of silica or other highly refractory material which is not a conductor of electricity.

Preferably I pass the air through a tube formed of silica in which are electrodes between which an arc is formed. Surrounding this silica tube is a glass tube through which a cooling medium, such, for instance, as a cooling liquid, is passed, thus forming a water jacket, as it were, for the silica tube. Surrounding this cooling tube, in proximity to the arc, is a rotary magnetic field, which rotates the arc around the inner surface of the silica tube. The air passing in contact with the inner surface of the silica tube is, by the rotating of the arc, highly heated, and as soon as the arc passes from any portion of the air, such air is immediately subjected to cooling action and its temperature rapidly reduced.

I will now describe an apparatus for carrying out my invention illustrated in section in the accompanying drawing, and then point out the invention in the claims.

$a$ is a silica tube within which are the electrodes $b$ connected with a source of current supply, not shown.

$c$ is a cap applied to each end of the tube $a$, the upper cap having the passage $d$ and the lower cap the passage $e$. Between the cap $c$ the tube $a$ is a packing $f$ tightly inserted to seal the connection at that point. The electrodes $b$ are tightly inserted and thus sealed with respect to the cap. The electrodes are provided with proper feeding mechanism. The cap $c$ is such that one portion of the cap closely surrounds the tube $a$ and another portion closely surrounds the electrodes. Between these two portions of the caps $a$ are, respectively, the passages $d$ and $e$ which connect with the space between the inner wall of tube $a$ and the electrodes $b$. The tube $a$ is surrounded by a tube $h$, preferably formed of glass in order to see the operation within the tube $a$. The ends of this tube $h$ are closed by the caps $i$, one cap having the inlet opening $j$ and the other the outlet $k$ for the circulation of the cooling medium.

Surrounding the tube $h$, adjacent to the point of formation of the arc $k'$ between the electrodes, are the field magnets, or rings $l$, which are energized by a polyphase current thus producing a rotary magnetic field.

In operation air is forced in through the passage $e$ into the zone between electrodes. When the arc is produced and the rotary magnetic field in action, the arc is caused to rotate around the inner periphery of tube $a$ coming in contact and acting upon successive portions of the air in contact with said tube. The arc at once highly heats such air. As soon as the arc passes from any portion of the air, such air being in contact with the wall of tube $a$, which is subjected at all times to the action of the cooling medium in tube $h$, has the high temperature produced by the arc immediately and rapidly reduced. By this operation the action of highly heating and cooling any given portion of the air is practically simultaneous, thus more perfectly and with greater certainty forming the oxids of nitrogen from the air. The voltage of the current should be sufficient to prevent disruption by the magnetic field, and may be readily determined for any given strength of magnetic field. I also force the air in at a pressure from atmospheric to that, say, of one hundred pounds. The oxids of nitrogen thus produced are the lower oxids and with the air unacted on pass along the tube in the space between the electrode and the wall of the tube escaping by the passage $d$ from which they may be led into water where they are converted into nitric acid, in the ordinary manner.

The method hereinbefore described forms the subject-matter of claims in a certain application filed by me November 14, 1908, Serial Number 462,568.

Having now fully described my invention, what I claim and desire to protect by Letters Patent is:—

1. An apparatus for producing oxids of nitrogen from air, comprising in combination a surface which is a non-conductor of electricity, in contact with which the air to be acted on is adapted to pass, electrodes between which an arc, longitudinally with respect to which said surface, is adapted to pass, and a rotary magnetic field adjacent to the arc space, said magnetic field being of strength sufficient to deflect the arc against said surface.

2. An apparatus for producing oxids of nitrogen from air, comprising in combination a surface which is a non-conductor of electricity, in contact with which the air to be acted on is adapted to pass, electrodes between which an arc, longitudinally with respect to which said surface, is adapted to pass, means to cool said surface, and a rotary magnetic field adjacent to the arc space, said magnetic field being of strength sufficient to deflect the arc against said surface.

3. An apparatus for producing oxids of nitrogen from air, comprising in combination a surface which is a non-conductor of electricity, in contact with which the air to be acted on is adapted to pass, electrodes between which an arc, longitudinally with respect to which said surface, is adapted to pass, means to directly cool said surface, and a rotary magnetic field adjacent to the arc space, said magnetic field being of strength sufficient to deflect the arc against said surface.

4. An apparatus for producing oxids of nitrogen from air, comprising in combination a container, the inner surface of which is a non-conductor of electricity, electrodes in said container between which an arc, longitudinally with respect to the inner surface of said container, is adapted to pass, and a rotary magnetic field exterior to the container adjacent to the arc space, said magnetic field being of strength sufficient to deflect the arc against the inner surface of said container.

5. An apparatus for producing oxids of nitrogen from air, comprising in combination a container, the inner surface of which is a non-conductor of electricity, electrodes in said container between which an arc, longitudinally with respect to the inner surface of said container, is adapted to pass, means to cool the walls of said container, and a rotary magnetic field exterior to the container adjacent to the arc space, said magnetic field being of strength sufficient to deflect the arc against the inner surface of said container.

6. An apparatus for producing oxids of nitrogen from air, comprising in combination a container, the inner surface of which is a non-conductor of electricity, electrodes in said container between which an arc, longitudinally with respect to the inner surface of said container, is adapted to pass, means to directly cool the walls of said container, and a rotary magnetic field exterior to the container adjacent to the arc space, said magnetic field being of strength sufficient to deflect the arc against the inner surface of said container.

7. In an apparatus for producing oxids of nitrogen from air, in combination, a silica tube surrounding electrodes between which an arc is to be established, and means to directly cool said tube.

8. An apparatus for producing oxids of nitrogen from air, comprising in combination a silica container, electrodes in said silica container between which an arc, longitudinally with respect to the inner walls of said silica container, is adapted to pass, and a rotary magnetic field exterior to the silica container adjacent to the arc space, said magnetic field being of strength sufficient to deflect said arc against the inner walls of said container.

9. An apparatus for producing oxids of nitrogen from air, comprising in combination a silica container, electrodes in said silica container between which an arc, longitudinally with respect to the inner walls of said silica container, is adapted to pass, means to cool the walls of said silica container, and a rotary magnetic field exterior to the silica container adjacent to the arc space, said magnetic field being of strength sufficient to deflect said arc against the inner walls of said container.

10. An apparatus for producing oxids of nitrogen from air, comprising in combination a silica container, electrodes in said silica container between which an arc, longitudinally with respect to the inner walls of said silica container, is adapted to pass, means to directly cool the walls of said silica container, and a rotary magnetic field exterior to the silica container adjacent to the arc space, said magnetic field being of strength sufficient to deflect said arc against the inner walls of said container.

In testimony of which invention, I have hereunto set my hand, at Philadelphia, on this 14th day of April, 1907.

FRANCIS I. DU PONT.

Witnesses:
M. M. HAMILTON,
A. M. URIAN.